Patented July 20, 1943

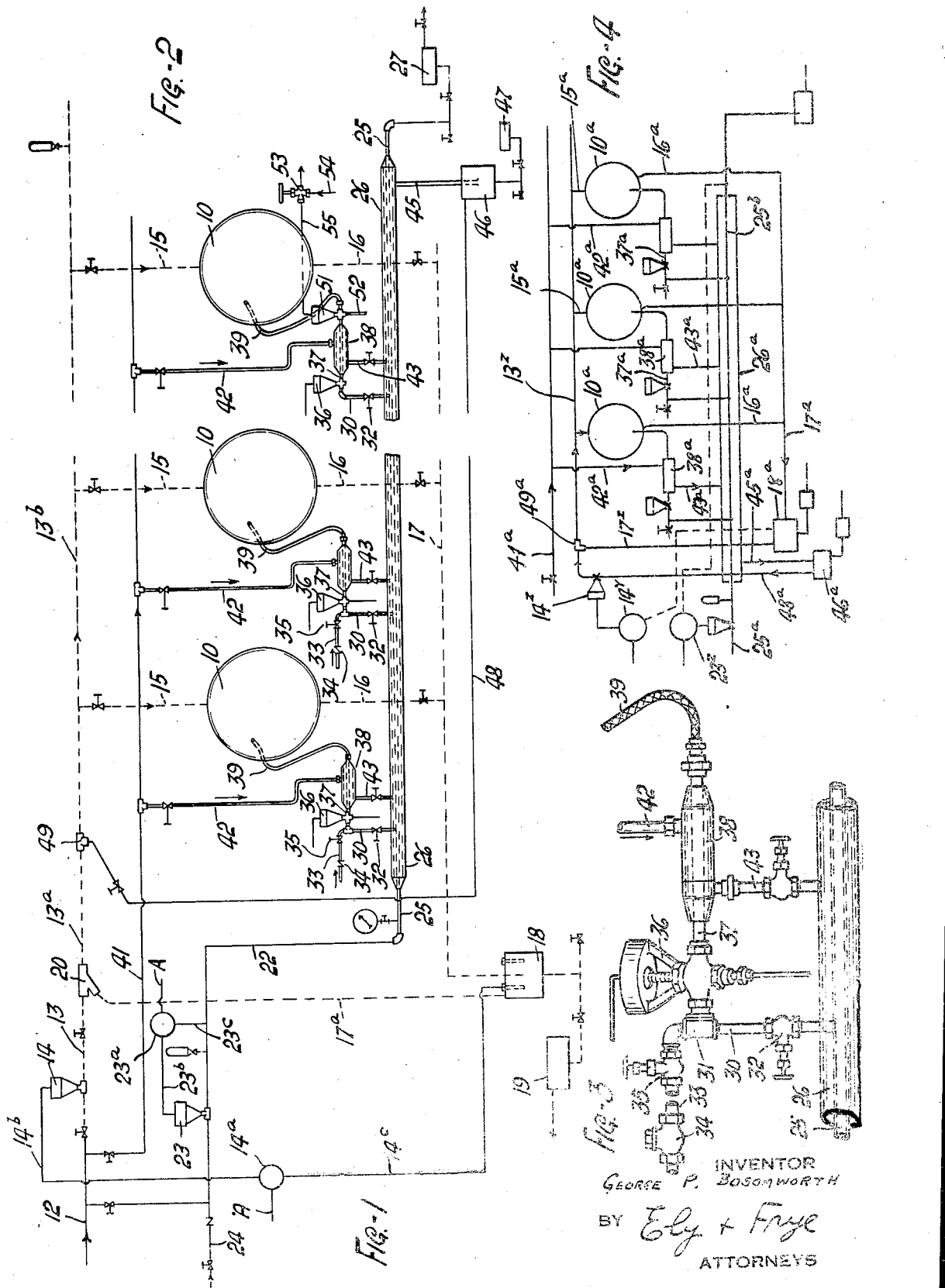

2,324,981

UNITED STATES PATENT OFFICE 2,324,981

VULCANIZING METHOD AND APPARATUS

George P. Bosomworth, Akron, Ohio, assignor to The Firestone Tire & Rubber Company, Akron, Ohio, a corporation of Ohio Application May 7, 1940, Serial No. 333,702

8 Claims. (Cl. 18—6)

This invention relates to vulcanizing methods and apparatus, and more especially it relates to improvements in procedure and mechanism for vulcanizing hollow rubber articles, such as inner tubes for pneumatic tire casings, by the use of superheated steam.

The chief objects of the invention are to provide an improved method and improved apparatus for supplying superheated steam to the vulcanizing molds; to effect high efficiency of heat transfer; to maintain a reservoir of superheated steam and at the same time create a definite flow of the high pressure steam throughout the header and into the tube-molding system; to effect the removal of air pockets in the piping of the system; to provide for the re-use of the steam that provides the superheat and thereby to conserve steam; to provide conveniently for superheating the steam close to the point where the same is to be utilized; to effect a reduction of the time required for vulcanizing inner tubes; and to provide a vulcanizing system of the character mentioned that is low in initial cost and has a low cost of operation. Other objects will be manifest as the specification proceeds.

Of the accompanying drawing:

Figure 1 is a piping diagram of a portion of a vulcanizing system embodying the invention, including two vulcanizing units;

Figure 2 is a piping diagram of another portion of the vulcanizing system showing one vulcanizing unit connected thereto in a slightly different manner;

Figure 3 is a detail elevation on a larger scale, of primary and secondary superheaters, and connections thereto at the vulcanizing units; and Figure 4 is a piping diagram of a portion of a modification of the vulcanizing system of the invention.

Referring to the drawing, particularly Figure 1 and Figure 3 thereof, there is shown a vulcanizing system comprising a plurality of vulcanizers 10, 10 for vulcanizing inner tubes for pneumatic tire casings. The inner tubes to be vulcanized are subject to external heat which is applied thereto through the walls of the mold (not shown) within the vulcanizer, and to internal heat and pressure applied directly to the interior of the tube through the valve stem thereof. The heated fluid applied to the interior of the tube is superheated steam, but means also is provided for admitting heated air into the tube in place of steam, as sometimes is desired.

Steam for vulcanization is supplied by a trunk line 12 in which the steam is at 180 lbs. pressure. From trunk line 12 extends a supply line 13 having sections 13a and 13b for supplying steam to the several vulcanizers 10, which steam heats the molds therein in which the work is mounted. The flow of steam from the trunk line 12 to supply line 13 is controlled by a diaphragm valve 14 that is operated by temperature-control apparatus 14a, which is connected to the valve by line 14b. This control apparatus is of standard construction and is connected to a separator 18 by line 14c, the operation of the control being determined by the temperature of the steam in the separator 18. The control is adjusted so that it intermittently supplies steam to the line and maintains the pressure in the line 13b at about 60 lb./sq. inch. Branch lines 15, 15 extend from the supply line 13b to the respective vulcanizers 10, and branch lines 16, 16 extend from the respective vulcanizers to a common steam return line 17. In the return line 17 is the separator 18 that includes the usual thermometers. Separator 18 discharges into a steam trap 19 that has connection with a drain in the usual manner. Steam passing through the separator 18 discharges into supply line 13 through a line 17a and an ejector 20 that is so arranged that the steam intermittently admitted to line 13 aids in drawing steam from line 17a to line 13a. Obviously the pressure in line 13 is built to a peak when the valve 14 is opened and then gradually decreases as steam flows through the ejector 20.

From trunk line 12 extends a supply line 22 for the primary superheater, the flow of steam into said line 22 being controlled by a diaphragm valve 23 that is operated by a pressure control 23a connected thereto by line 23b. As shown, this control 23a connects to the line 22 by line 23c and is adjusted so that it intermittently operates to admit steam to that line and maintain the pressure therein at about 80 lb./sq. inch. Both the controls 14a and 23a have low pressure air supply lines A connected thereto to aid in operating the valves with which they are associated. Also connected to line 22 is a supply line 24 of air under pressure, the arrangement being such that heated air instead of steam may be supplied to the work if such is desired. As is best shown in Figure 3, the primary superheater comprises an inner pipe 25, and an outer shell or casing 26 mounted concentrically thereabout, the ends of the casing 26 being sealed about pipe 25. The primary superheater is positioned adjacent the battery of vulcanizers 10. At one of its ends the superheater pipe 25 is connected to the line 22 aforementioned whereby steam or air may be passed therethrough, as shown in Figure 1. As shown in Figure 2, the other end of pipe 25 discharges into a steam trap 27 that is connected to a drain.

For conducting superheated steam from the superheater to each vulcanizer 10, pipes 30, 30 extend through the outer shell 26 of the superheater, adjacent each vulcanizer, and are tapped into the inner pipe 25 thereof. As best shown in Figure 3, each pipe 30 extends to a T-shaped coupling 31, there being a manually operable gate valve 32 between the superheater and said coupling. Also communicating with coupling 31 is an air pipe 33 that includes a check valve 34 and a manually operable gate valve 35. This construction permits air to be fed to one vulcanizer while steam is fed to a second vulcanizer. Connected to the T-coupling 31 is a valve 36 through which the superheated steam from the pipe 30, or air from the pipe 33, passes, said valve being an air-operated diaphragm valve that is controlled by a remote timing apparatus which is adapted to control the length of time that steam is admitted to the tubes in the vulcanizers. Steam or air passing through valve 36 discharges into a secondary superheater comprising an inner pipe 37 that is connected to said valve, and an outer shell or casing 38 mounted thereon in spaced relation thereto, said secondary superheater being positioned relatively close to the vulcanizer 10. Beyond the casing 38 the pipe 37 is connected to a flexible pipe or hose 39 that extends to the said vulcanizer where it connects to the inflating stem of an inflatable article (not shown) being vulcanized therein.

For heating the fluid that passes through the secondary superheaters, a supply line 41 is provided, which supply line connects with trunk line 12 and carries 180 lbs. steam. Branch pipes 42, 42 extend from supply line 41 to the respective superheaters and discharge into the space between pipes 37 and casings 38, at one end thereof. Extending from the opposite ends of said casings are respective pipes 43 that conduct the steam from the casings of the secondary superheaters into the casing 26 of the primary superheater. The casing 26 discharges from one end thereof through pipe 45 into a separator 46 wherein condensate is removed from the steam, said condensate discharging through a steam trap 47 into a drain. From the separator 46 the dry steam flows back to supply line 13 through pipe 48, and discharges into line 13 through ejector 49, the latter being so arranged as to assist in effecting the flow of steam in the lines 13a and 13b. The steam in line 48 is at about 178 lb./sq. inch so that the ejector 49 has a very restricted connection to that line to admit only a small volume of high pressure steam into line 13b continuously, the remainder of the steam therein passing through lines 13 and 13a.

In operation, high pressure steam is supplied through line 12 and a portion of the steam flows through valve 14 and then, under reduced pressure, through the vulcanizer 10 and discharges into separator 18. The pressure of the steam between valve 14 and ejector 20, due to a restriction in the ejector, usually is higher than in line 13a. This pressure differential effects a rapid flow of steam through the ejector to produce suction on the steam in line 17 and aids in circulating steam through the vulcanizers 10. Other steam flows directly from the high pressure source by line 41 and pipes 42 through the uperheating chambers 38 and 26, after which it is fed into the circulatory system through ejector 49 designed to permit limited flow of steam from line 48 wherein its pressure falls to that in the line to the molds. The pressure fall of the steam from line 48 also aids in circulating steam through lines 13b, 15, 16, 17 and 17a. The superheated steam obtained by heating the low pressure steam in lines 25 and 37 with the high pressure steam in the jackets 26 and 38 is then led into the interior of the tube to be vulcanized. This superheated steam is at about 80 lbs. pressure and that pressure is maintained during vulcanization by valve 23 permitting more steam to flow through the superheaters when the steam pressure in line 22 drops below a predetermined value.

The use of supplementary superheaters positioned relatively close to the respective vulcanizers results in high efficiency of heat transfer, and in actual practice has reduced the time required to vulcanize inner tubes from 10½ minutes to 8 minutes. The steam that provides the superheat is re-used in the tube-molding system, whereby economy of heat is effected, and said steam is fed into the header of the tube-molding system in such a manner as to effect a definite flow of the high pressure steam. By reason of said flow, the formation of air pockets is obviated and uniformity of heat in the vulcanizers is effected. The system is so arranged that either superheated steam or heated air may be discharged into the articles in the vulcanizer, and if heated air is ued it may be passed through both superheaters, or it may be passed solely through the secondary superheaters. In either case the air does not enter the course of the high pressure steam that heats the vulcanizers.

Sometimes in the manufacture of inner tubes the latter are lightly inflated with cold air before the vulcanizer is closed upon them. In Figure 2 is shown a piping arrangement by which this procedure readily may be accomplished. In most respects the piping of the vulcanizer shown in Figure 2 is similar to the piping of the vulcanizers previously described. In the arrangement shown in Figure 2, however, the air conducting pipe 33 is omitted, and the secondary superheater discharges through a three-way diaphragm valve 51 into the flexible hose 39, said valve 51 also having connection with a source of air (not shown) under pressure (100 lbs.) through the pipe 52. Operation of the valve 51 is effected manually by means of a foot-operated valve 53, the latter controlling fluid pressure (30 lbs. air) in the pipe 54, the valve 53 being connected to valve 51 by pipe 55. Operation of the valve 53 will effect operation of valve 51 to admit air from pipe 52 into the work in vulcanizer 10 through the agency of hose 39. When the valve 53 is inoperative, superheated steam may be delivered to the work in the same manner as in the embodiment of the invention shown in Figure 1.

The modified vulcanization system shown in Figure 4 comprises lines 25a and 41a to which steam at 180 lb./sq. inch is supplied. Steam flows through lines 42a to casings 38a, and then through lines 43a to a common casing 26a to superheat steam in line 25b, in casing 26a, and in lines 37a, in casings 38a. Steam flow to line 25b from 25a is controlled by a pressure control 23z, similar to the control 23, that intermittently is opened, dependent on the pressure in the end of line 25b, to maintain the desired pressure in inflatable articles within the vulcanizers 10a.

Steam exhausting from the casing 26a passes through a line 45a to a separator 46a and dry steam, at about 178 lbs./sq. inch, flows from the separator through line 48a. A valve 14z is positioned in line 48a and is opened intermittently to pass steam through an ejector 49a into a line 13z which supplies steam for heating the vulcanizers 10a. Steam passes to the vulcanizers through lines 15a and exhausts therefrom through lines 16a which lead the exhaust steam to a separator 18a by line 17a. Dry steam from the separator is recirculated through the vulcanizers and a line 17z connects the separator 18a to the ejector 49a for this purpose. Operation of valve 14z is controlled by a temperature control 14y dependent upon the temperature of steam in the separator 18a.

It will be observed that the vulcanizer system shown in Figure 4 operates similar to the system shown in Figure 1. The only real difference in the two systems is that in Figure 1, high pressure steam from line 48 is continuously injected into the steam flowing through the vulcanizers and steam is intermittently injected into that system through valve 14 whereas in Figure 4 high pressure steam is only intermittently supplied to the vulcanizer supply line 13z through valve 14z.

It will be understood that the terms "primary superheater" and "secondary superheater" as used hereinbefore, and used hereinafter in the appended claims, indicate precedence, that is, that the steam to be superheated passes first through a primary superheater and thereafter passes through a second superheater. The terms in no way indicate the relative importance of the superheaters.

Other modification may be resorted to without departing from the spirit of the invention or the scope thereof as defined by the appended claims.

What is claimed is:

1. Vulcanizing apparatus comprising a vulcanizer, a circulatory system of relatively low pressure steam of which said vulcanizer is a part, a superheater for air or steam in communication with an article within the vulcanizer, means discharging high pressure steam into the superheater to heat the same, and a piping connection between the superheater and the circulatory system whereby the superheating steam is returned to the latter, said piping connection discharging into the circulatory system through an ejector to assist in maintaining circulation in said system.

2. Vulcanizing apparatus as defined in claim 8 including an air connection to the secondary superheater whereby heated air may be passed to the article in the vulcanizer without passing through the primary superheater.

3. Vulcanizing apparatus as defined in claim 8 including an air connection with the delivery end of the secondary superheater whereby air may be passed to the article in the vulcanizer without first passing through either superheater.

4. That vulcanizing method comprising circulating relatively low pressure steam in a course that includes a vulcanizer, superheating relatively low pressure steam by relatively high pressure steam, feeding the superheated steam into an inflatable article within a vulcanizer, and ejecting the high pressure steam used in superheating into the circulating steam that passes through the vulcanizer to enhance the circulation of same.

5. Vulcanizing apparatus comprising a plurality of vulcanizers, a primary superheater for steam common to the several vulcanizers, secondary steam superheaters, through which steam passes in flowing from the primary superheater to the respective vulcanizer units, positioned adjacent the respective vulcanizers, and means for heating said primary and said secondary superheaters by means of high pressure steam which first passes through one of said secondary superheaters and thereafter passes through said primary superheater.

6. Vulcanization apparatus comprising a battery of vulcanizers requiring two vulcanization fluids, one of which is steam, therein, means for circulating relatively low pressure steam through each of said vulcanizers, a primary superheater adjacent said vulcanizers for the second vulcanization fluid, a plurality of secondary superheaters one of which is immediately adjacent each of said vulcanizers, means for leading the second vulcanization fluid to said primary superheater, individual means for leading said second vulcanization fluid to said secondary superheaters and then to said vulcanizers, means for feeding high pressure steam to each of said secondary superheaters and then to said primary superheater to heat same, and means for exhausting the high pressure steam used to heat said primary superheater into said circulatory system for said vulcanizers to aid in circulating steam therethrough.

7. The method of vulcanizing articles by the use of superheated steam which comprises conducting relatively low pressure steam into the article to be vulcanized, superheating said steam immediately prior to its admission to the article by subjecting it to a primary and thereafter to a secondary heating operation, said heating being effected by relatively high pressure steam that initially is employed in the secondary heating operation and immediately thereafter is employed in the primary heating operation, and then reducing the pressure of said high pressure steam and utilizing it to heat said article from the exterior thereof.

8. Vulcanizing apparatus comprising a vulcanizer, a circulatory system of relatively low pressure steam of which said vulcanizer is a part, for heating the latter, means for delivering a gaseous fluid in heated condition to the interior of an article in the vulcanizer, said means including a primary superheater and a secondary superheater in close proximity to the vulcanizer and through which said fluid passes in the order named, said fluid passing from the secondary superheater into the said article, means for feeding relatively high pressure steam in a course that passes through said secondary superheater and said primary superheater in the order named to transfer heat to said gaseous fluid, and means for discharging the high pressure steam from the primary superheater into the circulatory system of the vulcanizer, but at reduced pressure.

GEORGE P. BOSOMWORTH.